No. 790,502.

Patented May 23, 1905.

UNITED STATES PATENT OFFICE.

FRANK MARSHAL HOLMES, OF MARIONVILLE, MISSOURI, ASSIGNOR TO RICHARD H. STEVENS, TRUSTEE, OF CLAYTON, MISSOURI.

BATTERY SOLUTION.

SPECIFICATION forming part of Letters Patent No. 790,502, dated May 23, 1905.

Application filed January 25, 1904. Serial No. 190,611.

*To all whom it may concern:*

Be it known that I, FRANK MARSHAL HOLMES, a citizen of the United States, residing at Marionville, Lawrence county, State of Missouri, have invented certain new and useful Improvements in Battery Solutions, of which the following is a specification containing a full, clear, and exact description, reference being had to the accompanying drawings, forming a part hereof.

My invention relates to battery solutions, my object being to produce a battery solution which will give a strong regular dynamic current and for a greater length of time than the solutions heretofore in use.

My improved battery solution comprises the combination, with a suitable acid-exciting fluid, of a gum soluble in water.

An ordinary voltaic cell consists of a suitable vessel, an exciting fluid in the vessel, and a voltaic couple submerged in the exciting fluid. When the voltaic couple is properly connected, an electric circuit is established, the exciting fluid serving as a connection between the voltaic elements, and the strength of the current depends upon the action of the exciting fluid, upon the voltaic elements, and upon the difference in potential between the two elements. As soon as the connection is made the production of hydrogen gas commences and is indicated by the bubbles constantly arising from the positive-pole electrode. If the voltaic elements are zinc and copper, for instance, the zinc will be attacked by the exciting fluid and decomposition begins, thus liberating hydrogen gas and depositing hydrogen upon the copper plate, and this chemical action seriously interferes with the production of electricity. Furthermore, when a sulfate electrolyte is used the liquid evaporates rapidly and becomes impregnated with metallic salts or crystals, (zinc sulfate,) and this liquid must be frequently thrown away and replaced by new liquid. To overcome these difficulties it has been found that the addition of nitric or chromic acid to the exciting fluid will oxidize the hydrogen and to some extent improve the action of the cell; but the result was still unsatisfactory.

In some cases a solution of paraffin and oil has been added to the exciting fluid to form a coating on top of the liquid and prevent evaporation; but the result has been injury to the fittings and insulations with little if any benefit to the liquid.

It is the object of my invention to overcome these difficulties.

In the production of my improved battery solution I take a suitable gum, such as may be obtained from plants producing stone-fruit, dissolve the gum in water, and mix the gum with the acid-exciting fluid, and I have found by actual and repeated tests that this gum solution thickens the exciting fluid and forms a coating on top of the exciting fluid, thus retarding evaporation, and that in the production of electricity little or no hydrogen gas escapes, and that the hydrogen is oxidized and the zinc sulfate is deposited in the bottom of the cell, leaving the copper plate clean, that the solution will work many times longer than the old solutions, producing a strong steady current, that the consumption of zinc and copper is greatly reduced, thereby lessening the expense of maintaining a series of the cells, and that where cells formerly required almost daily attention they may now by the use of my invention be used for weeks and months without any change, and that the gum solution will not injure any part of the battery or any insulation with which it may come in contact.

In a companion application for battery solutions, filed January 25, 1904, Serial No. 190,608, I claim, broadly, the combination, with an exciting fluid, of a gum solution.

I claim—

1. A battery solution, comprising the combination with a suitable acid-exciting fluid, of a gum soluble in water, substantially as described.

2. In a battery, the combination with the exciting fluid, of a sealing-cover comprising a gum solution derived from the sap of pitted fruit-trees, substantially as set forth.

In testimony whereof I have signed my name to this specification in presence of two subscribing witnesses.

FRANK MARSHAL HOLMES.

Witnesses:
  ALFRED A. EICKS,
  M. G. IRION.